United States Patent
Davis et al.

(10) Patent No.: US 6,898,982 B2
(45) Date of Patent: May 31, 2005

(54) FORCE MEASUREMENT OF BIMETALLIC THERMAL DISC

(75) Inventors: George D. Davis, Bellevue, WA (US); Robert F. Jordan, Brier, WA (US)

(73) Assignee: Honeywell International, Inc., Morristown, NJ (US)

( * ) Notice: Subject to any disclaimer, the term of this patent is extended or adjusted under 35 U.S.C. 154(b) by 12 days.

(21) Appl. No.: 10/656,037

(22) Filed: Sep. 4, 2003

(65) Prior Publication Data

US 2004/0045362 A1 Mar. 11, 2004

Related U.S. Application Data

(62) Division of application No. 10/001,337, filed on Oct. 19, 2001, now Pat. No. 6,640,646.
(60) Provisional application No. 60/241,485, filed on Oct. 18, 2000.

(51) Int. Cl.$^7$ .................................................. G01L 1/00
(52) U.S. Cl. ...................................... 73/766; 73/862.381
(58) Field of Search .............................. 73/766, 862.381

(56) References Cited

U.S. PATENT DOCUMENTS

| | | | | |
|---|---|---|---|---|
| 3,246,840 A | * | 4/1966 | Matthies | 236/91 R |
| 3,739,643 A | * | 6/1973 | Gerich | 428/616 |
| 3,748,888 A | * | 7/1973 | Gerich | 72/375 |
| 4,414,524 A | * | 11/1983 | Doherty, Jr. | 337/87 |
| 5,263,643 A | * | 11/1993 | Wells et al. | 236/48 R |

* cited by examiner

Primary Examiner—Edward Lefkowitz
Assistant Examiner—Andre Allen
(74) Attorney, Agent, or Firm—Charles J. Rupnick Attorney at Law

(57) ABSTRACT

An apparatus and method for determining the actuation energy generated by a bimetallic actuator during transit between first and second states of stability. The apparatus and method further determining the threshold or set-point temperature of the bimetallic actuator during transit between bi-stable states. Accordingly, the apparatus and method directly measure both the snap force F and the set-point temperature of the bimetallic actuator during transit.

23 Claims, 4 Drawing Sheets

FORCE MEASUREMENT OF BIMETALLIC THERMAL DISC

This application is a Division of application Ser. No. 10/001,337, filed Oct. 19, 2001 now U.S. Pat. No. 6,640,646, which claims the benefit of U.S. Provisional Application Ser. No. 60/241,485, filed in the names of George D. Davis and Robert F. Jordan on Oct. 18, 2000, the complete disclosure of which is incorporated herein by reference.

FIELD OF THE INVENTION

The present invention relates generally to methods for manufacturing thermally responsive bimetallic members, and in particular to methods for determining the snap energy generated by snap-action bimetallic members during transit between first and second states of stability.

BACKGROUND OF THE INVENTION

Thermally responsive bimetallic members that exhibit a snap-action response are commonly utilized to actuate overheat protection and thermostatic switching mechanisms. One type of such mechanisms is a thermostatic switch that utilizes an actuator formed of a bimetallic material having materials of relatively low and high thermal expansion coefficients joined together along a common interface. Snap-action bimetallic switching mechanisms typically exhibit two states of stability with each of these states being responsive to a predetermined threshold or set-point temperature. When the switching mechanism senses a temperature that is below a first lower of these predetermined set-point temperatures, the thermally responsive member is in one of the two stable states. Accordingly, when the sensed temperature is above a second higher predetermined set-point temperature, the thermally responsive member snaps to a second of the two stable states and remains in this second state while the sensed temperature remains at or above this second higher set-point temperature. Should the sensed temperature be reduced to the first lower temperature, the temperature of the member is lowered correspondingly. As a result, the thermally responsive member snaps back to the first lower temperature state. The difference between the two predetermined set-point temperatures corresponding to the respective first and second states of stability is known as the "differential temperature" of the thermally responsive member.

A known method of manufacturing thermally responsive snap-action switches of the variety described above has included a forming operation in which a pre-sized blank of the thermally responsive bimetallic member is positioned between two opposingly positioned shaping or die members. The shaping members are actuated to engage the bimetallic member, thereby providing the bimetallic member with the desired configuration needed to achieve snap-action at each of the two predetermined set-point temperatures. Such a configuration usually consists of a knee and/or corresponding bowed portion, a dimpled portion or portions, or a series of ridges. Examples of such of formations are described in U.S. Pat. No. 3,748,888 and 3,933,022, each of which is incorporated herein by reference in its entirety, wherein a thermally responsive snap-action bimetallic disc is provided.

U.S. Pat. No. 3,748,888 also describes a smoothly formed prior art disc-shaped snap-action bimetallic member, as illustrated in side view in FIG. 1. A bimetallic member 1 is formed using a disc of material formed of two materials 2, 3 having different thermal expansion coefficients joined together along contiguous surfaces. One of the members 2 is formed of a material having a relatively high coefficient or rate of thermal expansion, while the other member 3 is formed of a material having a low coefficient or rate of thermal expansion relative to that of the first member 2. The difference in thermal expansion coefficients between the two members 2, 3 is a factor in determining the set-point temperature at which the resulting bimetallic disc actuator 1 operates and in an actuation force F produced by the snap-action. The disc-shaped bimetallic member 1 is often circular and, in some instances, is provided with a small, centrally located aperture therethrough (not shown). Bimetallic discs of this type are generally formed by "bumping" a flat circular disc blank with a punch-and-die set to stretch the bimetallic material of the disc into the concave structure having a depth H1, as illustrated by full line 4 in FIG. 1. The bimetallic disc 1 is formed, for example, with a substantially planar peripheral hoop portion 5 surrounding a central portion 6 stretched into a concave configuration. The central portion 6 is mobile relative to the peripheral hoop portion 5, the central portion 6 moving from one side of the peripheral hoop portion 5 to the other as a function of temperature. The set-point operation temperature and the force F applied by the snap-action are thus physical characteristics of the two members 2, 3 that form the bimetallic member 1.

Generally, when the bimetallic disc 1 is intended to operate at a temperature above ambient temperature, the disc 1 is bumped on the high expansion rate side 2 to form the central stretched portion 6, whereby the central portion 6 is stretched to space the inner concave surface thereof to a depth H1 away from the plane P of the peripheral hoop portion 5, as illustrated by the full line configuration 4. The depth of penetration of the punch during the bumping operation determines the depth H1 and thus is another factor in determining both the upper set-point temperature and the force F applied by the snap-action operation of the disc 1. The set-point operation temperature and the force F applied by the snap-action are thus also structural characteristics of the bimetallic member 1, as also described in above-incorporated U.S. Pat. No. 3,748,888.

The bimetallic disc 1 is illustrated in FIG. 1 in full line 4 in one of its two states of stability. Assuming the bimetallic disc 1 is intended for operation at a set-point temperature above ambient temperature, the high expansion rate side is located on the surface 2 and the low expansion rate side is along the surface 3. If the bimetallic disc 1 is intended for operation at a set-point temperature below ambient temperature, the bimetallic disc 1 is formed in the opposite shape with the low expansion side located on the surface 2 and the high expansion rate side along the surface 3. For purposes of explanation only, the bimetallic disc 1 shown in FIG. 1 is assumed to be intended for operation at a set-point temperature above ambient temperature. Accordingly, at a temperature well below the upper set-point temperature the bimetallic disc 1 is configured with the central stretched portion 6 in an upwardly concave state, as shown by the upper dotted line 7.

As the temperature of the bimetallic disc 1 is raised to approach its upper set-point operating temperature, the high expansion rate material 2 begins to stretch, while the lower expansion rate material 3 remains relatively stable. As the high expansion rate material 2 expands or grows, it is restrained by the relatively more slowly changing lower expansion rate material 3. Both the higher and lower expansion rate sides 2, 3 of the bimetallic disc 1 become distorted by the thermally induced stresses, and the central mobile portion 6 of the bimetallic disc 1 changes configuration with a slow movement or "creep" action from the upper dotted line configuration 7 to the full line configuration 4. The inner concave surface of the central mobile portion 6 is spaced the depth H1 away from the plane P of the peripheral hoop portion 5. The full line configuration 4 is considered herein to be a first state of stability.

As soon as the temperature of the bimetallic disc 1 reaches its upper predetermined set-point temperature of operation, the central stretched portion 6 of the disc 1 moves with snap-action downward through the unstretched hoop portion 5 to the second state of stability with the inner concave surface of the central mobile portion 6 spaced a distance H2 away from the plane P of the peripheral hoop portion 5, as shown by the phantom line 8. If the temperature of the bimetallic disc 1 is raised to a still higher temperature, the high expansion rate material 2 continues to expand at a greater rate than the relatively lower expansion rate material 3 joined thereto. As a result of this continued differential expansion, the central mobile portion 6 of the bimetallic disc 1 continues to creep toward a state of even greater downward concavity, as shown by the second lower dotted line configuration 9.

As the temperature of the bimetallic disc member 1 is reduced form the high temperature toward the lower predetermined set-point temperature of operation, the central mobile portion 6 of the bimetallic disc 1 moves from the state of extreme concavity, as shown by the lower dotted line 9, toward the second state of stability indicated in phantom 8. As the temperature of the bimetallic disc 1 is reduced below the second or lower predetermined set-point temperature of operation, the material 2 having the relatively larger thermal coefficient also contracts or shrinks more rapidly than the other material 3 having the relatively smaller thermal coefficient. The bimetallic disc 1 changes configuration with a similar slow movement or creep action from the state of greatest downward concavity toward the second state of stability indicated in phantom 8. As the bimetallic disc 1 reaches the lower set-point temperature, the central stretched portion 6 snaps back through the unstretched hoop portion to the first state of stability, as shown by the upper full line 4. If the temperature is decreased still further, the differential expansion between the high and low rate materials 2, 3 causes the central mobile portion 6 to continue to creep toward the state of greatest upward concavity, as shown by the upper dotted line 7.

Many thermal switch designs use one of the bimetallic discs 1 that snap into a different state of concavity at a predetermined threshold or set-point temperature, thereby closing a contact or other indicator to signal that the set-point has been reached. The speed at which the bimetallic disc actuator 1 changes state is commonly known as the "snap rate." As the term implies, the change from one bi-stable state to the other is not normally instantaneous, but is measurable. A slow snap rate means that the state change occurs at a low rate of speed, while a fast snap rate means that the state change occurs at a high rate of speed. Accordingly, in some known configurations of switch and indicator devices, a slow snap rate results in arcing between the operative electrical contacts. Slow snap rates thus limit the current carrying capacity of the thermal switch or indicator device. In contrast, a fast snap rate means that the change in state occurs rapidly, which increases the amount of current the thermal switch or indicator device can carry without arcing. The temperature rate of change affects the snap rate. A slower temperature rate of change tends to slow the snap rate, while a faster temperature rate of change usually results in a faster snap rate. While some applications provide fast temperature rates, switches and indicators experience very slow temperature rates in many other applications. In some applications, the temperature rates may be as low as about 1 degree F. per minute or less. For long-term reliability the device must operate in these very slow temperature application rates without arcing.

Furthermore, a minimum force F is required to actuate the contacts. As described above, the force F is thermally induced in the bimetallic disc 1 as the result of both the depth H1 of the concavity formed in the disc 1, and the differential thermal expansion rate between the high and low expansion rate sides 2, 3 thereof. The force F produced during transit from one state of stability to the other state must be sufficiently powerful to overcome the contact restoring force in order to actuate the device. For example, the force F must be sufficient to overcome a restoring spring force in a flexible switch contact. If a bimetallic disc 1 with insufficient snap force F is installed into a thermal switch or other indicator device, the switch or device may fail prematurely, requiring replacement of the bimetal disc 1 or replacement of the entire mechanism.

Typically, the snap force F generated by the individual bimetallic disc 1 is tested prior to installation in the using device. For example, the bimetallic discs 1 are pre-tested under maximum load to ensure that each exerts sufficient snap force F at temperature application rates of about 1 degree F. per minute or less to actuate the device's contact without arcing. One known method of ensuring the snap quality of the bimetallic disc 1 is testing of the force F produced during actuation of the snap in situ. Pre-testing is thus accomplished by placing the disc 1 in the intended device and testing the fully assembled thermal switch or other indicator mechanism. Pre-testing is thus cumbersome and time consuming. Furthermore, the present in situ testing process is typically a simple go/no-go test in which marginally performing bimetallic discs 1 may remain undiscovered. The manufacturer may thus be forced to employ excessively conservative quality control measures.

SUMMARY OF THE INVENTION

The present invention is a method and means for determining an amount of energy released by a thermally responsive snap-action bimetallic actuator. The method of the invention includes forming a bimetallic disc having a mobile center portion surrounded by a substantially immobile peripheral portion; qualifying an energy released by transit of the mobile portion from a first side of the peripheral portion to a second opposite side of the peripheral portion during operation of a snap action; and subsequently assembling the disc into operative relationship with a movable indicator portion of a sensing device.

According to another aspect of the invention, the method of the invention includes presenting a thermally responsive snap-action bimetallic actuator to a sensing portion of a force sensing device while the actuator is configured in a first pre-snap state wherein a mobile portion of the actuator is spaced away from the sensing portion of the force sensing device, and determining a force generated by the actuator during transit to a second post-snap state wherein the mobile portion of the actuator is moved into forceful contact with the sensing portion of the force sensing device.

According to one aspect of the invention, presenting the actuator to the sensing portion of the force sensing device includes thermally activating the actuator to transit to the second post-snap state.

According to another aspect of the invention, presenting the actuator to the sensing portion of the force sensing device includes placing the actuator on a support structure configured to support the actuator.

According to another aspect of the invention, determining a force generated by the actuator includes detecting a peak force generated by moving the mobile portion of the actuator into forceful contact with the sensing portion of the force sensing device.

According to another aspect of the invention, presenting the actuator to the sensing portion of the force sensing device includes positioning the actuator in proximity to a thermal stage, and activating the thermal stage. Activating the thermal stage includes activating the thermal stage in a controlled manner. According to another aspect of the invention, determining a force generated by the actuator includes determining an energy-temperature rate relationship exhibited by the actuator.

According to still another aspect of the invention, the method of the invention also includes assembling the actuator into operative relationship with a movable indicator portion of a thermal sensing device.

According to other aspects of the invention, the invention provides an energy measuring device having a means for supporting a bimetallic member in a first pre-snap state; a means for qualifying an energy released by the bimetallic member during transit from the first pre-snap state to a second post-snap state, the qualifying means being positioned relative to the supporting means to be engaged by the bimetallic member in the second post-snap state; and a means for thermally activating the bimetallic member, the thermally activating means being positioned relative to the supporting means for thermally activating the bimetallic member to transit from the first pre-snap state to the second post-snap state.

According to another aspect of the invention, the means for qualifying the released energy includes means for measuring a force generated by the bimetallic member, and may also include means for measuring a peak force generated by the bimetallic member during the transit from the first pre-snap state to the second post-snap state.

According to another aspect of the invention, the thermally activating means of the device includes means for thermally activating the bimetallic member in a controlled manner, including for example, means for heating or cooling the bimetallic member at a controlled rate of temperature change.

According to another aspect of the invention, the means for supporting the bimetallic member in the first pre-snap state includes means structured to support a substantially immobile peripheral portion of the bimetallic member while a substantially mobile portion of the bimetallic member that is located centrally to the peripheral portion is disengaged from the qualifying means.

BRIEF DESCRIPTION OF THE FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF PREFERRED EMBODIMENTS

In the Figures, like numerals indicate like elements.

The present invention is an apparatus and method for determining the snap energy or snap force F generated by a bimetallic actuator during transit between first and second states of stability. The invention further provides an apparatus and method for determining of the threshold or set-point temperature of the bimetallic actuator during transit between bi-stable states. Accordingly, the apparatus and method provide for directly measuring both the snap force F and the set-point temperature of the bimetallic actuator during transit.

Figure 2:
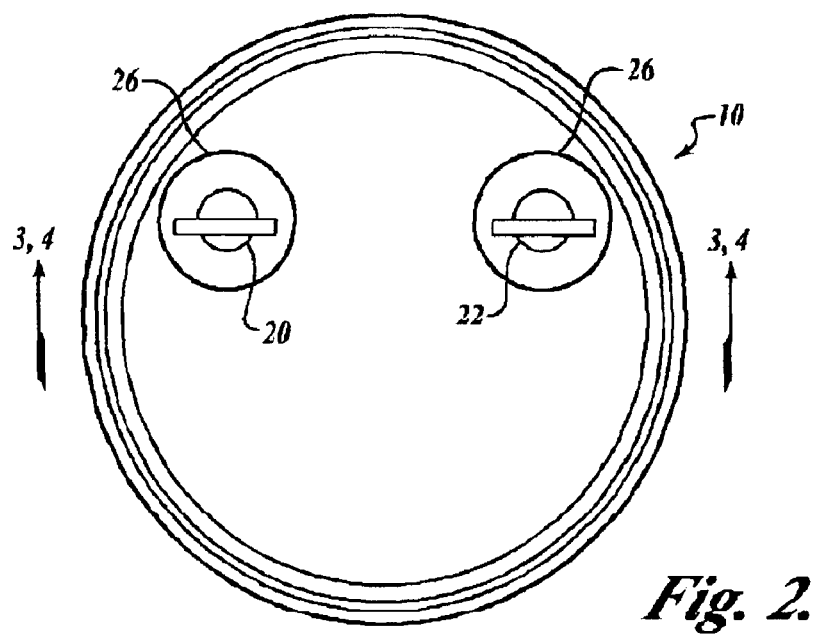
FIG. 2 is a top plan view of the thermally responsive device of the present invention embodied as a snap-action thermal switch.
Figure 3:
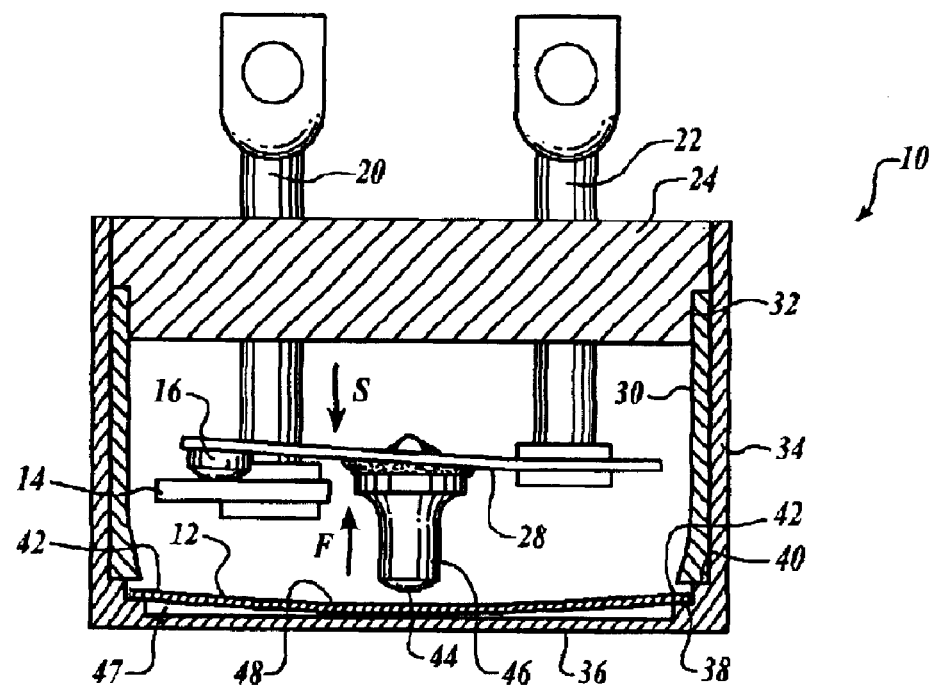
FIG. 3 is a cross-sectional view of the snap-action thermal switch illustrated in FIG. 2, wherein the electrical contacts form a closed circuit.
Figure 4:
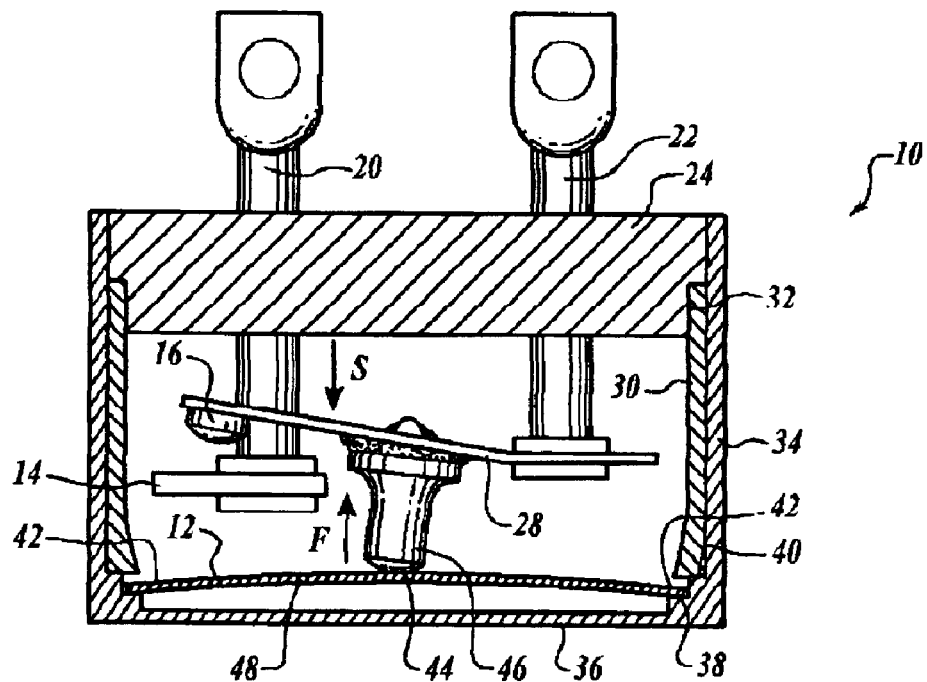
FIG. 4 is another cross-sectional view of the snap-action thermal switch illustrated in FIG. 2, wherein the electrical contacts form an open circuit.

FIG. 2 is a top plan view and FIGS. 3 and 4 are cross-sectional views of the thermally responsive device of the present invention embodied as a snap-action thermal switch 10. The snap-action is driven by a thermally responsive snap-action actuator of the present invention embodied as a snap-action bimetallic disc actuator 12, wherein the bimetallic disc actuator 12 includes a minimum snap force F generated during transit between bi-stable states at a predetermined set-point temperature as determined according to the method of the invention. For example, the method is operated using the apparatus of the invention. The thermal switch 10 also includes a pair of electrical contacts 14, 16 that are relatively movable under the control of the disc actuator 12. The electrical contacts 14, 16 are mounted on the ends of a pair of spaced-apart, electrically conductive terminal posts 20, 22 that are mounted in a header 24 such that they are electrically isolated from one anther. For example, terminal posts 20, 22 are mounted in the metallic header 24 using a glass or epoxy electrical isolator 26.

As illustrated in FIGS. 3 and 4, the electrical contacts 14, 16 are moveable relative to one another between an open state (FIG. 4) and a closed state (FIG. 3). For example, the movable contact 16 is affixed to an electrically conductive carrier 28 that is embodied as an armature formed of an electrically conductive spring material. The armature 28 is affixed in turn in a cantilever fashion to the electrically conductive terminal post 22 such that a spring pressure S of the armature 28 operates to bias the movable contact 16 toward the fixed contact 14 to make electrical contact therewith, as shown in FIG. 3. The electrical contacts 14, 16 thus provide an electrically conductive path between the terminal posts 20, 22 such that the terminal posts 20, 22 are shorted together.

The disc actuator 12 is spaced away from the header 24 by a spacer ring 30 interfitted with a peripheral groove 32. A cylindrical case 34 fits over the spacer ring 30, thereby enclosing the terminal posts 20, 22, the electrical contacts 14, 16, and the disc actuator 12. The case 34 includes a base 36 with a pair of annular steps or lands 38 and 40 around the interior thereof and spaced above the base 36. The lower edge of the spacer ring 30 abuts the upper case land 40. A peripheral edge portion 42 of the disc actuator 12 is captured within an annular groove created between the lower end of the spacer ring 30 and the lower case land 38. The disc actuator 12 operates the armature spring 28 to separate the contacts 14, 16 through the distal end 44 of an intermediary striker pin 46 fixed to the armature spring 28. Separation of the contacts 14 and 16 creates an open circuit condition.

As shown in FIG. 3, while the thermal switch 10 is maintained below a predetermined set-point temperature, the disc actuator 12 is maintained in a first state with the bimetallic disc actuator 12 withdrawn into a space 47 between the lower case land 38 and the case end 36. In this first state, an inner concave surface 48 of an arcuate or dish-shaped central mobile portion 49 of the bimetallic disc actuator 12 is spaced away from the intermediary striker pin 46, whereby the actuator force F is removed from the armature 28. The relatively moveable electrical contacts 14, 16 are moved together under the spring pressure S supplied by the armature 28 and thereby form a closed circuit. The spacing between the inner concave surface 48 of the bimetallic disc actuator 12 and the distal end 44 of the striker pin 46 is sufficient to prevent slight movement of the actuator disc 12 effecting contact engagement.

In FIG. 4, the armature 28 is operated under the control of the bimetallic disc actuator 12, which inverts the central mobile portion 49 with a snap-action as a function of a predetermined set-point temperature between bi-stable states of opposite concavity. As shown in FIG. 4, in response to an increase in the sensed ambient temperature above the predetermined set-point, the central mobile portion 49 inverts in a high speed, forceful snap-action into a loaded relationship with the electrical contacts 14, 16, whereby the inner concave surface 48 is inverted into an outer convex surface 48 that rapidly engages the distal end 44 of the intermediary striker pin 46. The snap-action of the bimetallic disc actuator 12 operates at the predetermined set-point temperature to rapidly generate a force F that is predetermined to be sufficient to overcome the spring pressure S of the armature 28. Accordingly, operation of the bimetallic disc actuator 12 flexes the movable contact 16 away from the fixed contact 14. For example, the disc actuator 12 operates through the intermediary striker pin 46 fixed to the armature spring 28 to pivot the armature spring 28 upwardly, thereby separating the contacts 14, 16. Separation of the contacts 14, 16 creates an open circuit condition.

The snap rate and force F with which the central mobile portion 49 of the bimetallic disc actuator 12 changes state determine the speed with which the contacts 14, 16 are allowed to come together to make the circuit, or are separated to break the circuit. The make and break speeds determine how much current can be carried without undesirable arcing between the contacts 14, 16. Faster make and break speeds increase the amount of current the thermal switch 10 can carry without arcing, and thus increase reliability while extending the useful life of the thermal switch 10.

According to one embodiment of the invention, the bimetallic disc actuator 12 is fabricated to transit or snap the central mobile portion 49 at a high rate while exerting at least a minimum force F. Accordingly, the snap-action of the bimetallic disc actuator 12 changes state within about 1 millisecond while exerting sufficient force F to overcome the spring pressure S of the armature 28 to break the circuit. The movable contact 16 is thus flexed away from the fixed contact 14 rapidly, so that little arcing occurs. The current carrying capacity of the thermal switch 10 is thereby maximized.

When the ambient temperature sensed by the bimetallic disc actuator 12 is reduced below the predetermined set-point, the fast snap rate rapidly returns the central mobile portion 49 to the spaced-away, noninterference relationship with the electrical contacts 14, 16, as shown in FIG. 3. The relatively moveable electrical contacts 14, 16 are rapidly moved together again under the spring pressure S of the armature 28. A closed circuit between the two terminal posts 20, 22 is thereby formed. Accordingly, one embodiment of the invention provides a snap-action that changes state of the bimetallic disc actuator 12 within about 1 millisecond. The spring pressure S of the armature 28 causes the movable contact to follow the retreating central mobile portion 49 of the disc actuator 12. The movable contact 16 is thus flexed into contact with the fixed contact 14 rapidly, so that arcing is minimized and the current carrying capacity of the thermal switch 10 is maximized.

The thermal switch 10 is sealed to provide protection from physical damage. The thermal switch 10 is optionally hermetically sealed with a dry Nitrogen gas atmosphere having trace Helium gas to provide leak detection, thereby providing the contacts 14, 16 with a clean, safe operating environment.

Figure 5:
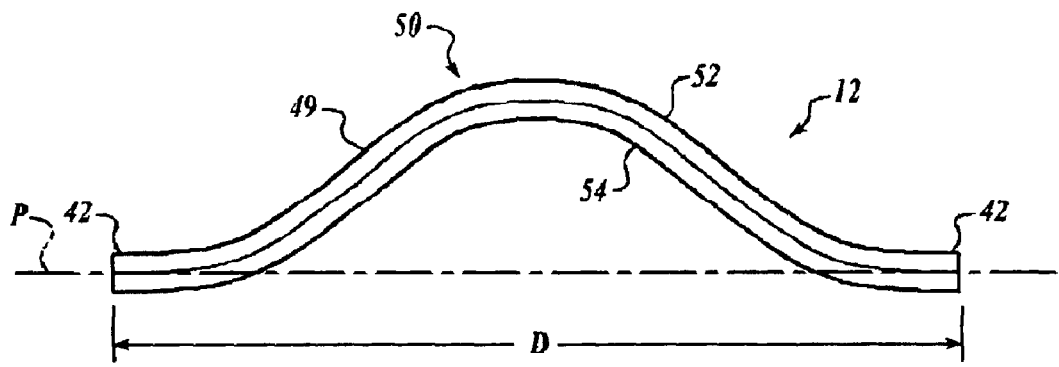
FIG. 5 illustrates the thermally responsive bimetallic member realized by the method of the invention embodied as a bimetallic disc actuator.

FIG. 5 illustrates the thermally responsive bimetallic member realized by the method of the invention embodied as the bimetallic disc 12. The central mobile portion 49 of the bimetallic disc 12 generates a predetermined minimum snap force F at a predetermined set-point temperature during temperature application at a predetermined rate as determined by a test performed in a prescribed manner according to the method of the invention. For example, the method is operated using the apparatus of the invention. The bimetallic disc actuator 12 according to the invention is initially fabricated according to generally known methods, as described in connection with FIG. 1. For example, a thermally responsive bimetallic material 50, such as ASTM-1, is selected according to known criteria for forming a bimetallic actuator. Such thermally responsive bimetallic material includes a first metallic material 52 having a first coefficient or rate of thermal expansion and a second metallic material 54 having a second relatively higher rate of thermal expansion. The first and second metallic materials 52, 54 of the thermally responsive bimetallic material 50 are bonded together along one contiguous surface 56.

The bimetallic material 50 is formed into a blank of desired shape and size. For example, a flat, round disk-shaped blank is formed having a diameter D sized to move freely within the annular groove created in the thermal switch assembly 10 between the lower end of the spacer ring 30 and the lower case land 38.

The disk-shaped blank is subjected to a forming or "bumping" operation in which the blank of thermally responsive bimetallic material is positioned between two opposingly positioned shaping members (not shown). The shaping members are actuated to engage the disk-shaped blank of bimetallic material 50, thereby forming the bimetallic disc 12 with the central mobile portion 49 having a configuration that achieves forceful snap-action at each of the two predetermined set-point temperatures. For example, the disk-shaped blank is placed in a female die which supports the blank along its peripheral edge portion 42. A male punch having a spherical end is pressed against the center of the disc to stretch the metal and form the central mobile portion 49 having the inner dish-shaped concave surface 48. The peripheral edge portion 42 either retains its substantially planar initial shape, or is formed by the shaping members with a substantially planar shape. Examples of such dish-shaped discs are illustrated in U.S. Pat. Nos. 2,717,936 and 2,954,447, each of which is incorporated herein by reference in its entirety. The formed bimetallic disc may be subsequently subjected to a heat treatment operation in order to achieve forceful snap-action of the central mobile portion 49 at each of the two predetermined set-point temperatures.

The method and apparatus of the present invention reduce or eliminate reiterative processes of screening the snap force F by installing the bimetallic disc actuators 12 into fully assembled thermal switches 10 or other thermally responsive indicator mechanisms. In contrast to current reiterative screening methods, the method and apparatus of the present invention determine the energy, i.e. the snap force F, generated during the snap-action transit of the central mobile portion 49 of the bimetallic disc 12 before it is assembled into a sensor mechanism. Low energy bimetallic discs 12 are identified and removed from a pool of usable hardware. The method and apparatus of the present invention thereby result in predictable product delivery since the measurement of the snap force F prevents imbalanced mechanisms from reaching customers. Improved predictability satisfy customer requirements for quality and reliability while reducing manufacturing costs.

Figure 6:
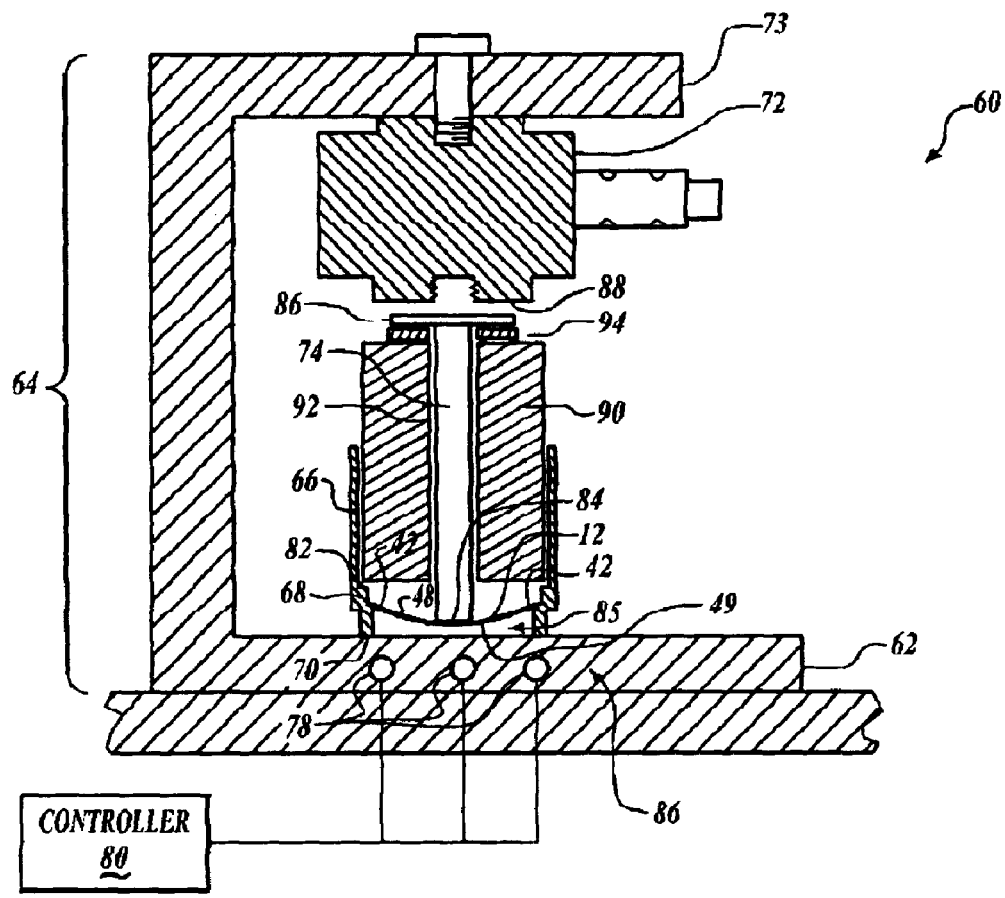
FIG. 6 illustrates the testing apparatus of the invention embodied as a disc snap-energy tester.

FIG. 6 illustrates the testing apparatus of the invention embodied as a disc snap-energy tester 60. The snap energy of the central mobile portion 49 of each individual disc 12 is effectively determined by thermally inducing the snap-action state transformation under controlled conditions and measuring the snap force F prior to installation into a sensor mechanism.

According to one embodiment of the invention, the disc energy tester 60 is an apparatus having a support structure 62 upon which a measuring device 64 is mounted. The measuring device 64 includes a supporting means 66 for supporting one of the bimetallic discs 12 in a manner substantially similar to the intended application. For example, the supporting means 66 is embodied as a stand or column formed to resemble a portion of the intended thermal switch 10 or other indicator device, such as the cylindrical case 34 shown in FIGS. 3 and 4. The supporting means 66 is, for example, embodied having a first annular step or land 68 around the interior thereof and spaced above a base or lower edge 70 thereof. The land 68 is sized to support the peripheral edge portion 42 of the bimetallic disc 12 above the base 70. A suitable force indicator 72, such as a conventional pressure-sensing transducer, is spaced above the bimetallic disc 12. For example, the force indicator 72 is suspended from an arm portion 73 of the measuring device 64 overhanging the support structure 62 and the supporting means 66. The force indicator 72 is of a type that senses a maximum or peak force $F_P$ of the snap and displays the value of the peak force $F_p$ in a useful manner. Optionally, the force indicator 72 is positioned in sufficiently close proximity to the bimetallic disc 12 that the snap force F is measured directly. Alternatively, the force indicator 72 is spaced away from the bimetallic disc 12 and the snap force F is measured through an intermediary member 74.

A means 76 for thermally inducing the snap-action transformation in a controlled manner is provided. For example, the support structure 62 is embodied as containing a thermal stage 78 capable of inducing a predetermined, adjustable and controllable rate of temperature change in the bimetallic disc 12 under test. The thermal stage 78 includes adjustable and controllable heating sources. For example, the heating sources are thermoelectric devices such as commercially available electrical resistive devices. For actuation temperatures above ambient, controlled cooling is provided by alternate energizing and de-energizing of the controllable heating sources. Alternatively, cooling sources are provided as a manifold formed in the support structure 62 and filled with a coolant such as liquid nitrogen (LN2) or carbon dioxide (CO2) derived from a conventional external source (not shown). Temperature control is provided external to the energy tester 60, for example, by a conventional programmable controller 80 such as are well-known for providing precise control of thermal application rate and steady-state temperatures.

The disc energy tester 60 shown in FIG. 6 is embodied for testing the bimetallic disc 12 intended to actuate the contacts 14, 16 in a thermal switch 10. Accordingly, the supporting means 66 is embodied as a hollowed column structure formed in a tube or sleeve configuration similar to the cylindrical case 34 shown in FIGS. 3 and 4. The material of the hollowed column supporting means 66 is a thin stainless steel, which is either the same or a similar material used to form the cylindrical case 34. The sizes and relative spacings of the land 68 around the interior of the hollowed column supporting means 66 and the base 70 thereof are similar to the land 38 and the base 36, respectively, of the cylindrical case 34. Furthermore, the supporting means 66 embodied as a hollowed column structure includes a second annular step or land 82 around the interior thereof The second land 82 is paired with the land 68 and spaced above it relative to the base 70. The pair of annular lands 68, 82 are formed to resemble the pair of annular lands 38, 40 around the interior of the thermal switch case 34. The spacing between the land 82 and each of the respective land 68 and base 70 is similar to the spacing between land 40 and the respective land 38 and base 36 of the case 34. The supporting means 66 is thus substantially identical to the support structure provided by the intended device.

As embodied in FIG. 6, the force indicator 72 is spaced away from the bimetallic disc 12. The snap force F is applied to the force indicator 72 through the intermediary member 74, which is embodied as a stiff, lightweight drive pin formed of titanium or another suitable material. The intermediary drive pin 74 may be hollowed to reduce its weight. A lighter weight drive pin 74 has less effect on the measurement of the snap force F. A first end portion 84 of the intermediary pin 74 is configured similarly to the striker pin 46 and contacts the inner concave surface 48 of the bimetallic disc 12 when it is configured in a first pre-snap state, wherein mobile central portion 49 of the bimetallic disc 12 is withdrawn into a space 85 between the first annular land 68 and the base 70 of the hollowed column structured supporting means 66, its inner concave surface 48 being spaced away from the force indicator 72. Alternatively, the first portion 84 of the intermediary pin 74 is spaced slightly away from the surface 48 of the bimetallic disc 12 under test, whereby the weight of the intermediary pin 74 is absent from the bimetallic disc 12 in the first pre-snap state. Accordingly, the first portion 84 of the intermediary drive pin 74 is spaced slightly away from the inner concave surface 48 of the bimetallic disc 12. The intermediary pin 74 is thus positioned similarly to the striker pin 46 of the thermal switch 10 when the central mobile portion 49 of the bimetallic disc 12 is withdrawn into the space 47 between the lower case land 38 and the case end 36 so that the contacts 14, 16 are configured in a closed circuit condition.

A second end portion 86 of the pin 74 is configured in a shape suitable for striking the force indicator 72. The pin 74 has a length sized to substantially but not completely fill the space between the between the bimetallic disc 12 and the force indicator 72 when the bimetallic disc 12 is configured in the first pre-snap state having the inner concave surface 48 of its central mobile portion 49 spaced away from the force indicator 72, whereby the snap force F is absent from the force indicator 72. In other words, the pin 74 is short enough that it does not press on the force indicator 72 when the bimetallic disc 12 is withdrawn into the space 85 between the first annular land 68 and the base 70 of the hollowed column structured supporting means 66.

Figure 7:
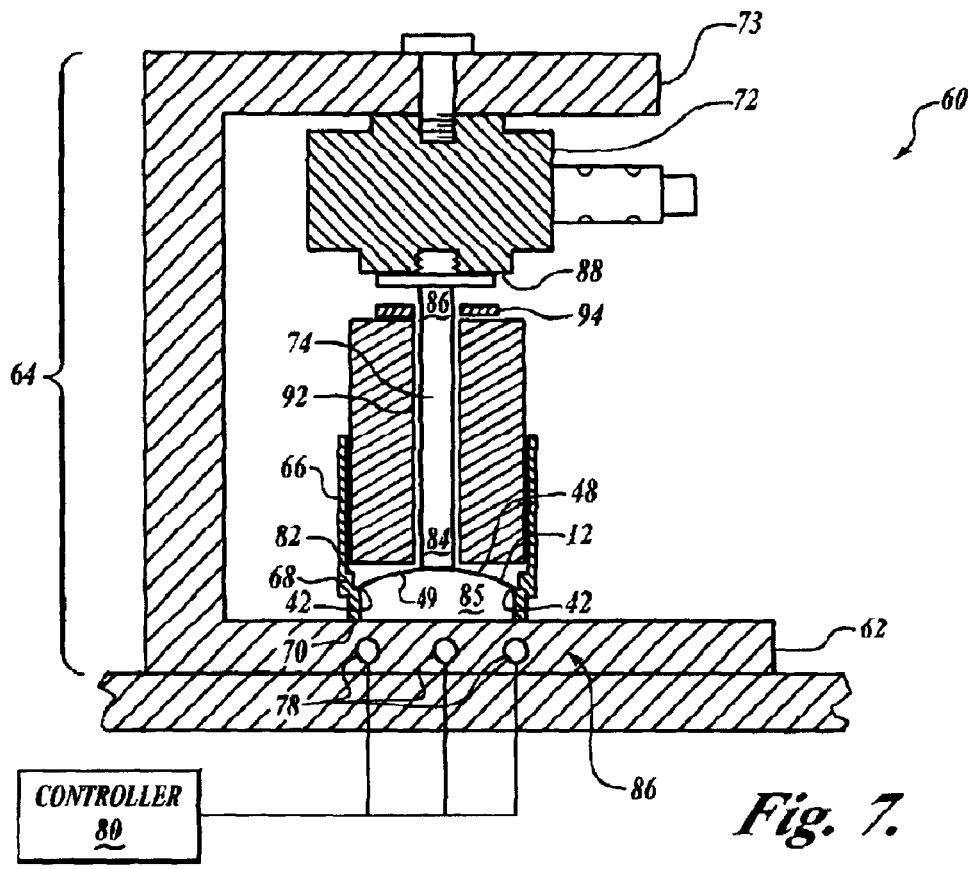
FIG. 7 illustrates the sizing of an intermediary drive pin positioned between a sensitive operational portion of a force indicator of the testing apparatus of the invention shown in FIG. 6 and an actuated bimetallic disc that is configured in a second post-snap state.

FIG. 7 illustrates that the pin 74 is further sized to drive against a sensitive operational portion 88 of the force indicator 72 when the bimetallic disc 12 is configured in a second post-snap state, wherein the inner concave surface 48 of the central mobile portion 49 is inverted into an outer convex surface 48 directed toward the force indicator 72. Accordingly, the intermediary drive pin 74 completely fills the space between the bimetallic disc 12 and the force indicator 72 and transmits the snap force F of the bimetallic disc 12 to the sensitive operational portion 88 of the force indicator 72 for the measurement thereof. Stated differently, during testing the central mobile portion 49 of the bimetallic disc 12 is inverted into an outer convex surface 48 that rapidly engages the first end 84 of the intermediary drive pin 74. The drive pin 74 transmits the energy in the snap of the bimetallic disc 12 through the second end 86 of the pin 74 into the sensitive portion 88 of the force indicator 72.

In summary, the support means 66 provides the annular land 68 to support the bimetallic disc along its peripheral edge 42 and within the space 85 between the annular land 68 and the base 70 of the hollowed column structure. In its first pre-snap state the central mobile portion 49 of the bimetallic disc 12 is withdrawn into the space 85 so that its inner concave surface 48 is spaced away from the force indicator 72. The snap force F is thus absent from the force indicator 72. This first pre-snap state is consistent with the closed circuit condition of the thermal switch 10 wherein the inner concave surface 48 of the central mobile portion 49 is spaced away from the intermediary striker pin 46 and the actuator force F is removed from the armature 28, which permits the contacts 14,16 to close. During testing the bimetallic disc 12 is inverted into its second post-snap state wherein the inner concave surface 48 of the central mobile portion 49 is inverted into an outer convex surface 48 that rapidly engages the pin 74 and presses it into the force indicator 72. This second post-snap state is consistent with the open circuit condition of the thermal switch 10 wherein the outer convex surface 48 rapidly engages the intermediary striker pin 46 and the actuator force F is applied to the armature 28, which forces the contacts 14, 16 open. The apparatus of the invention thus tests the snap force F applied by the central mobile portion 49 of the bimetallic disc 12 under test during transit from the first pre-snap state to the second post-snap state.

According to one embodiment of the invention, a cylindrical spacer 90 is mounted on the second land 82 formed around the interior of the hollowed column structured supporting means 66 adjacent to the bimetallic disc 12. The spacer 90 operates similarly to the spacer ring 30 of the thermal switch 10. The spacer 90 cooperates with the first land 68 to form an annular groove within which the peripheral edge portion 42 of the bimetallic disc 12 is captured.

The spacer 90 is also provided with an aperture 92 sized to slidingly engage the drive pin 74. The aperture 92 provides a track for guidance of the drive pin 74. When the drive pin 74 is installed in the aperture 92 of the cylinder 90, the first end 84 contacts the central mobile portion 49 of the bimetallic disc 12, and the second end 86 is positioned for striking the sensitive portion 88 of the force indicator 72. According to one embodiment of the invention, the spacer 90 is formed of a thermally insulating material, such as glass or ceramic.

Spacing adjusting means 94 are optionally provided for adjusting the position of the first end 84 of the intermediary drive pin 74 to compensate for differences in the thickness of the bimetallic disc 12 under test. For example, the spacing adjusting means 94 are embodied as shims provided between the cylindrical spacer 90 and the second end 86 of the drive pin 74.

Figure 8:
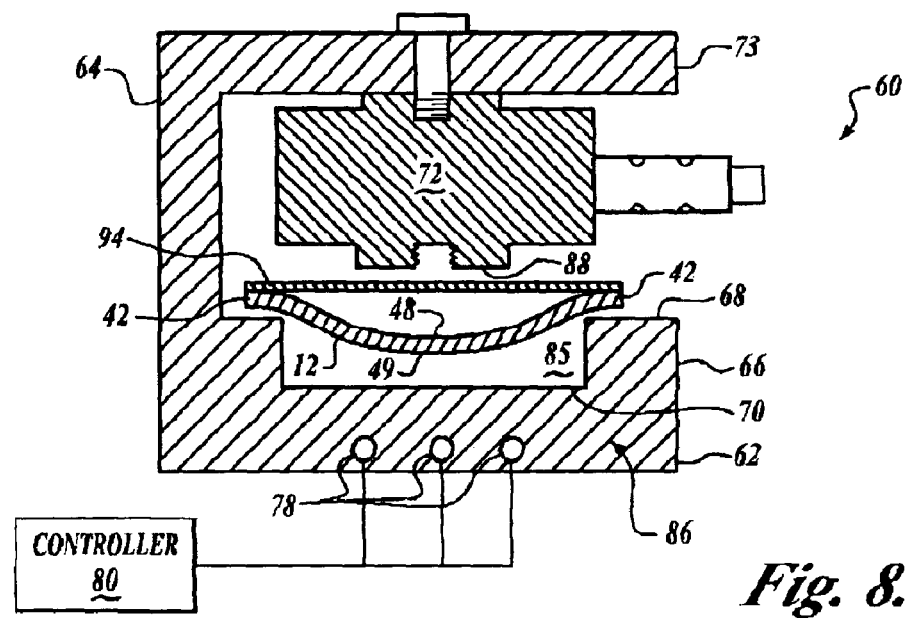
FIG. 8 illustrates the disc snap-energy tester of the invention embodied without an intermediary drive pin.

FIG. 8 illustrates the energy tester 60 of the invention embodied without the intermediary drive pin 74. The supporting means 66 is embodied having the first annular step or land 68 around the interior thereof and spaced above a base or lower edge 70 thereof The land 68 is sized to support the peripheral edge portion 42 of the bimetallic disc 12 above the base 70. The force indicator 72 is spaced above the supporting means 66 in sufficiently close proximity to the bimetallic disc 12 that the snap force F is measured directly, without being transmitted through the intermediary drive pin 74. Accordingly, the force indicator 72 is again suspended from the arm portion 73 of the measuring device 64 overhanging the support structure 62 and the supporting means 66. According to the embodiment illustrated in FIG. 8, the arm portion 73 spaces the force indicator 72 in sufficiently close proximity to the bimetallic disc 12 that the snap force F generated by the central mobile portion 49 is measured directly.

Spacing adjusting means 94 are again optionally provided to compensate for differences in the thickness of the bimetallic disc 12. The adjusting means 94 adjusts the relative spacing between the force indicator 72 and the bimetallic disc 12 under test. For example, the spacing adjusting means 94 are embodied as shims provided between the bimetallic disc 12 under test and operational portion 88 of the force indicator 72.

According to the method of the invention, the bimetallic discs 12 are subjected to pressure testing that is performed in a prescribed manner, whereby the energy-tested bimetallic disc 12 of the invention is formed.

Figure 1:
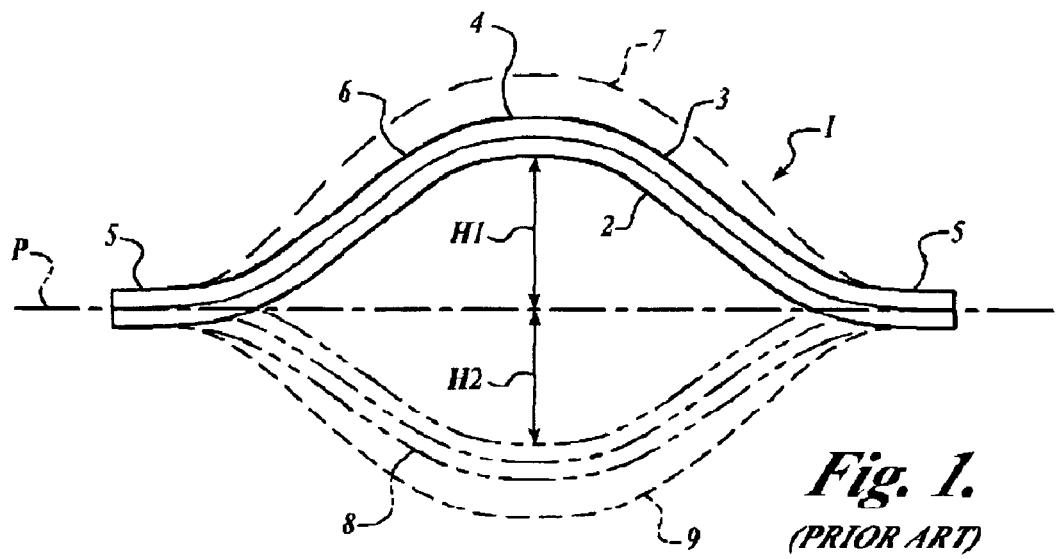
FIG. 1 illustrates a known bimetallic actuator disc.

The bimetallic disc 12 is formed according to conventional methods by shaping a flat circular disc with a punch-and-die set to stretch the bimetallic material into the concave structure illustrated by the full line 4 in FIG. 1. The bimetallic disc 12 is formed with a substantially planar peripheral hoop portion 42 surrounding the central mobile portion 49 that is stretched into a concave configuration. Examples of such dish-shaped discs are illustrated in U.S. Pat. Nos. 2,717,936 and 2,954,447, each of which is incorporated herein by reference in its entirety. The formed bimetallic disc may be subsequently subjected to a heat treatment operation in order to achieve forceful snap-action at each of the two predetermined set-point temperatures.

The dish-shaped bimetallic discs 12 are subjected to thermal testing, which determines the actuation or set-point temperature of each individual disc 12, and the discs 12 are categorized according to a predetermined methodology. For example, the tested discs 12 are separated by material type into categories defined by low set-point temperature ranges of about 1 to 2 degrees Fahrenheit with predetermined differential temperatures.

According to the invention, the categorized bimetallic discs 12 are presented to the force indicator 72 according to a prescribed manner for determining an amount of energy released by the thermally responsive snap-action bimetallic disc 12. The method of the invention is embodied as qualifying an energy released by transit of the mobile portion 49 of the bimetallic disc 12 from a first pre-snap side of the peripheral edge portion 42 to a second opposite side of the peripheral edge portion 42 during operation of a snap-action. The qualified bimetallic disc 12 is subsequently assembled into an operative relationship with a movable indicator portion of a thermal sensing device. For example, the qualified disc 12 is assembled with the thermal switch 10 in the position described above for interacting with the intermediary striker pin 46, whereby the qualified disc 12 moves the mobile contact 16 away from the fixed contact 14 during actuation.

The released energy is qualified by presenting the disc 12 to a force sensing device such as the force indicator 72. The disc 12 is presented on the supporting means 66 while the central mobile portion 49 is positioned on the first pre-snap side of the substantially immobile peripheral edge portion 42 opposite from the force indicator 72. The disc 12 is supported on its generally immobile peripheral edge portion 42. The dish-shaped central mobile portion 49 is extended on the side of the edge portion 42 away from the force indicator 72. In other words, the central mobile portion 49 is withdrawn into the space 85 between the first annular land 68 and the base 70 of the hollowed column structured supporting means 66, the inner concave surface 48 of the central mobile portion 49 being thus spaced away from the force indicator 72. The disc 12 is presented sufficiently closely to the operational portion 88 force indicator 72 that the mobile portion 49 is positioned to forcefully interact with the operational sensing portion 88 of the force indicator 72 during transit to the second post-snap side of the peripheral edge portion 42 proximate to the force indicator 72. As described above, the forceful interaction with the operational sensing portion 88 of the force indicator 72 is either direct or through an intermediary mechanism such as the drive pin 74.

The snap energy is released by thermally activating the bimetallic disc 12 in the presence of the force indicator 72. The method thus includes changing the temperature of the disc 12 to transit the central mobile portion 49 from the first pre-snap side to the second post-snap side of the peripheral edge portion 42 proximate to the force indicator 72. The mobile portion 49 of the disc 12 is moved into contact with the operational portion 88 of the force indicator 72 during transit from the first pre-snap side to the second post-snap side of the peripheral edge portion 42. To qualify according to the method of the invention, a bimetallic disc 12 applies a minimum force $F_M$ to the operational portion 88 of the force indicator 72 during actuation. The operational sensing portion 88 of the force indicator 72 thus senses the peak force $F_P$ generated by the transit of the central mobile portion 49 during actuation.

The bimetallic disc 12 is thermally activated by either heating or cooling it through the set-point temperature using the thermal stage 78. Heating and cooling are under the control of the programmable controller 80. According to one embodiment of the invention, the programmable controller 80 is used to control the heating and cooling rates of thermal stage 78 so that the bimetallic disc 12 is heated or cooled at temperature rates as low as about 1 degree F. per minute or less. The disc 12 under test is thus qualified for long-term reliability in devices that must operate in conditions of very slow temperature application rates without arcing. Optionally, the controller 80 is used to control the thermal stage 78 at several different temperature rates of change so that the disc 12 under test is thermally activated at a plurality of different controlled rates of temperature change. Snap force F and set-point temperature data are taken at each actuation of the disc 12, and an energy-temperature rate relationship is determined for the disc 12 under test.

Obviously, many modifications and variations of the present invention are possible in light of the above teachings. Thus, it is to be understood that, within the scope of the appended claims, the invention may be practiced otherwise than as specifically described above.

What is claimed is:

1. A method for determining an amount of energy released by a thermally responsive snap-action bimetallic disc, the method comprising:

forming a bimetallic disc having a mobile center portion surrounded by a substantially immobile peripheral portion;

qualifying an energy released by transit of the mobile portion from a first side of the peripheral portion to a second opposite side of the peripheral portion during operation of a snap action; and subsequently assembling the disc into operative relationship with a movable indicator portion of a sensing device.

2. The method of claim 1 wherein qualifying the released energy includes thermally activating the disc in the presence of a force sensing device.

3. The method of claim 2 wherein qualifying the released energy further includes moving the mobile portion of the disc into contact with an operational portion of the force sensing device during transit of the mobile portion from the first side to the second side of the peripheral portion.

4. The method of claim 3 wherein thermally activating the disc includes one of heating and cooling the disc.

5. The method of claim 3 wherein qualifying the released energy includes determining a minimum force applied to the operational portion of the force sensing device during transit of the mobile portion of the disc.

6. The method of claim 3 wherein qualifying the released energy includes thermally activating the disc at a controlled rate of temperature change.

7. The method of claim 6 wherein qualifying the released energy includes thermally activating the disc at a plurality of different controlled rates of temperature change.

8. A method for determining an amount of energy released by a thermally responsive snap-action bimetallic actuator, the method comprising:

initially qualifying an energy released by transit of a center portion of a thermally responsive snap-action bimetallic actuator surrounded by a peripheral portion from a first side of the peripheral portion to a second opposite side of the peripheral portion during operation of a snap action;

subsequently presenting a thermally responsive snap-action bimetallic actuator to a sensing portion of a force sensing device while the actuator is configured in a first pre-snap state wherein the center portion of the actuator is spaced away from the sensing portion of the force sensing device; and determining a force generated by the actuator during transit to a second post-snap state wherein the center portion of the actuator is moved into forceful contact with the sensing portion of the force sensing device.

9. The method of claim 8 wherein presenting the actuator to the sensing portion of the force sensing device includes thermally activating the actuator to transit to the second post-snap state.

10. The method of claim 8 wherein presenting the actuator to the sensing portion of the force sensing device includes supporting the peripheral portion of the actuator.

11. The method of claim 8 wherein determining a force generated by the actuator includes detecting a peak force generated by moving the center portion of the actuator into forceful contact with the sensing portion of the force sensing device.

12. The method of claim 8 wherein presenting the actuator to the sensing portion of the force sensing device includes positioning the actuator in proximity to a thermal stage, and activating the thermal stage.

13. The method of claim 12 wherein activating the thermal stage includes activating the thermal stage in a controlled manner.

14. The method of claim 13 wherein determining a force generated by the actuator includes determining an energy-temperature rate relationship exhibited by the actuator.

15. The method of claim 14, further comprising assembling the actuator into operative relationship with a movable indicator portion of a thermal sensing device.

16. A method for determining a an amount of energy released by a thermally responsive snap-action bimetallic disc during a snap action of the bimetallic disc, the method comprising:

qualifying an energy released by motion of a first portion of a thermally responsive snap-action bimetallic disc relative to a second portion of the bimetallic disc during operation of a snap action of the bimetallic disc;

after qualifying the energy released, presenting the thermally responsive snap-action bimetallic disc to a force indicator on a support structure while the first portion of the disc is positioned on one side of the second portion opposite from the force indicator, the disc being presented sufficiently closely to the force indicator that the first portion is positioned to forcefully interact with a sensing portion of the force indicator during motion of the first portion of the bimetallic disc relative to the second portion;

changing a temperature of the disc to transit the first portion into a position on the second side of the second portion proximate to the force indicator; and sensing with the sensing portion of the force indicator a peak force generated by the motion of the first portion.

17. The method of claim 16 wherein changing the temperature of the disc includes changing a temperature of the support structure.

18. The method of claim 16 wherein changing the temperature of the disc includes changing the temperature at a controlled rate.

19. The method of claim 16 wherein the temperature of the disc is below an actuation temperature of the disc prior to changing.

20. The method of claim 19 wherein changing the temperature of the disc includes increasing the temperature above the actuation temperature.

21. The method of claim 16 wherein presenting the disc to the force indicator on a support structure includes simulating a portion of a structure intended to support the disc during operation in a temperature sensing device.

22. The method of claim 16 wherein changing a temperature of the disc to transit the first portion into a position on the second side of the second portion proximate to the force indicator includes generating a force with the motion of the first portion of the disc relative to the second portion.

23. The method of claim 22 wherein sensing a peak force generated by the disc includes applying the force generated by the disc to the sensing portion of the force indicator.

* * * * *